United States Patent [19]
Kunz

[11] Patent Number: 4,911,803
[45] Date of Patent: Mar. 27, 1990

[54] COMPOSITE HYDROGEN PURIFICATION MEMBRANE AND METHOD FOR PURIFYING HYDROGEN

[76] Inventor: Harold R. Kunz, 26 Valley View La., Vernon, Conn. 06066

[21] Appl. No.: 221,070

[22] Filed: Jul. 19, 1988

[51] Int. Cl.$^4$ .............................................. C25F 5/00
[52] U.S. Cl. ................................... 204/130; 204/282; 204/283; 204/291; 204/292; 204/293; 204/294; 204/295; 204/296; 502/152; 502/159; 502/174
[58] Field of Search .................... 204/130, 282–283, 204/291–294, 295, 296, 129; 521/27; 429/30, 33, 41, 43; 502/152, 159, 174

[56] References Cited

U.S. PATENT DOCUMENTS

| | | | |
|---|---|---|---|
| 2,773,561 | 12/1956 | Hunter | 204/129 |
| 3,888,749 | 6/1975 | Chong | 204/129 |
| 4,594,297 | 6/1986 | Polak et al. | 429/33 |
| 4,615,954 | 10/1986 | Solomon et al. | 429/42 |
| 4,620,914 | 11/1986 | Abens et al. | 204/130 |
| 4,804,592 | 2/1989 | Vanderborgh et al. | 429/42 |

FOREIGN PATENT DOCUMENTS

| | | | |
|---|---|---|---|
| 2047428 | 3/1972 | Fed. Rep. of Germany | 204/20 |
| 2326667 | 12/1974 | Fed. Rep. of Germany | 429/43 |

Primary Examiner—John F. Niebling
Assistant Examiner—Kathryn Gorgos
Attorney, Agent, or Firm—Darby & Darby

[57] ABSTRACT

A composite hydrogen purification membrane comprises an anode for hydrogen oxidation, a cathode for hydrogen reduction, with a proton conductor disposed between and in contact with the anode and the cathode. Electrons are conducted between the anode and cathode through an external connection, with the electron flow generated by the difference in hydrogen partial pressure between the anode and cathode sides of the membrane. Thus the composite hydrogen purification membrane provides high hydrogen permeability and selectivity relative to the impurities in a feed gas, producing pure hydrogen without requiring an external voltage source.

44 Claims, 2 Drawing Sheets

COMPOSITE HYDROGEN PURIFICATION MEMBRANE AND METHOD FOR PURIFYING HYDROGEN

TECHNICAL FIELD

This invention relates to hydrogen purification devices and more specifically to hydrogen purification devices which incorporate a membrane.

BACKGROUND ART

Hydrogen is a common industrial chemical which is used in a wide variety of chemical processes. Hydrogen is also used extensively as a fuel, both for direct combustion and in fuel cells. Many of these applications, including some fuel cells, require that the hydrogen supplied to them be relatively pure.

The most common source for industrial hydrogen is a steam reformer. In a steam reformer, a gaseous fuel is mixed with steam and passed over a catalyst to produce a stream containing hydrogen, carbon dioxide, carbon monoxide, and water. In applications in which any of the products other than the hydrogen is considered an impurity, the reformer product stream must be purified. For example, carbon dioxide is harmful to alkaline fuel cells and carbon monoxide is harmful to solid polymer electrolyte fuel cells. If hydrogen from a reformer is to be fed to either of these types of fuel cells, either the carbon dioxide or the carbon monoxide must first be removed. The carbon monoxide content can be reduced by passing the product stream over another catalyst at a temperature favoring the conversion of carbon monoxide and water to produce hydrogen and carbon dioxide by the water-gas shift reaction.

Currently, there are several methods available for separating hydrogen from the impurities in order to purify a reformer product stream. However, none of these methods are entirely satisfactory. One common method for performing this separation is to use a permeable membrane. The membrane may be fabricated either from a polymer such as polyetherimide or from a metallic combination such as palladium-silver. The polymeric membranes rely on differences in the relative diffusivities of the gaseous molecules through the membrane to make the desired separation. Since hydrogen will diffuse more readily through the polymeric membranes than other molecules, polymeric membranes may be used to purify hydrogen. However, other molecules can also diffuse through the membrane, resulting in an incomplete separation of hydrogen from the other molecules. The result is a low hydrogen selectivity relative to other molecules. The relatively low hydrogen selectivities which characterize polymeric membranes make them impractical where very high purity hydrogen is required.

Metallic palladium-silver membranes provide excellent hydrogen selectivity because they transport hydrogen in its atomic state, rather than its molecular state. The diffusivities of all other molecules, which must be transported in a molecular state, are extremely low through palladium-silver membranes. However, the materials used to fabricate palladium-silver membranes are not as readily available as polymeric materials, making them undersirable to use for most hydrogen purification applications. Recently, palladium and silver have been vacuum sputtered onto polyetherimide in thin films in an effort to combine the best properties of polymeric and palladium-silver membranes. These membranes have shown promising results.

Other possible means for purifying hydrogen streams include cryogenic separation and pressure swing absorption. Both of these processes require elaborate processing equipment, which makes them unsuitable for many hydrogen purification applications.

Accordingly, there has been a continuous effort in this field of art to develop a highly selective hydrogen purification membrane which is practical for a variety of applications.

DISCLOSURE OF INVENTION

The present invention is directed toward solving the problem of developing a highly selective hydrogen purification membrane which is practical for a variety of applications.

One aspect of this invention includes a composite hydrogen purification membrane which comprises an anode for hydrogen oxidation and a cathode for hydrogen ion reduction. A proton conductor means is disposed between and in contact with the anode and the cathode. An electron conductor means connects the anode and the cathode.

Another aspect of this invention includes a method of purifying a gas containing hydrogen and gaseous impurities using a composite hydrogen purification membrane as recited above. The gas containing the hydrogen and gaseous impurities is contacted with the anode such that the hydrogen contained in the gas is oxidized by the anode to form protons and electrons. The protons are conducted to the cathode through the proton conductor means. The electrons are conducted to the cathode through the electron conductor means. At the cathode, the protons and electrons recombine in a reduction reaction to form hydrogen molecules. The hydrogen is removed from the cathode in order to maintain a hydrogen partial pressure differential between the anode and the cathode.

The foregoing and other features and advantages of the present invention will become more apparent from the following description and drawings.

BEST MODE FOR CARRYING OUT THE INVENTION

Figure 1:
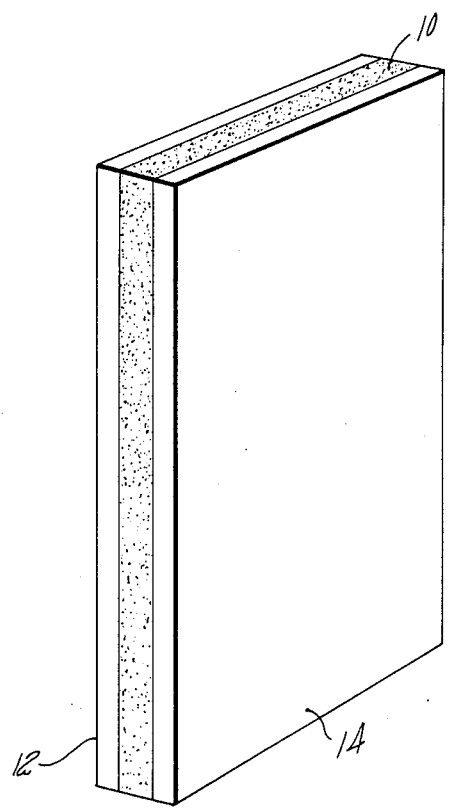
FIG. 1 shows the preferred configuration of a composite hydrogen purification membrane.

This invention comprises a new class of membranes which purify hydrogen by a mechanism which is radically different than that employed by other types of separation membranes. Conventional polymeric membranes separate molecules based on the differences between their diffusivities through the membrane. Palladium-silver membranes preferentially transport hydrogen in its atomic state. The composite membrane which is the subject of this disclosure transports hydrogen in an ionized state and transfers all other molecules by diffusion.

The composite membrane which is the subject of this invention comprises an anode capable of oxidizing hydrogen molecules to protons and electrons, a proton conductor means, an electron conductor means, and a cathode which is capable of reducing protons to hydrogen molecules. Although the composite membrane may have a plurality of anodes and cathodes, it will typically have only one of each. In the preferred embodiment of this invention, both the proton conductor and electron conductor are integral elements of the membrane. However, the electron conductor may comprise an external electrical connection between the anode and the cathode.

To perform the separation, a gas containing hydrogen and gaseous impurities is supplied to the anode. (Although this invention is primarily directed towards removing gaseous impurities from hydrogen, it can also remove some non-gaseous impurities from a hydrogen stream.) At the anode, a catalyst oxidizes the hydrogen contained in the gas to protons and electrons. The protons are conducted through the proton conductor means to the cathode, while the electrons are conducted through the electron conductor means to the cathode. At the cathode, protons and electrons recombine in a catalytically promoted reduction reaction to produce hydrogen molecules. The hydrogen is then removed from the cathode.

The driving force for this separation is a voltage differential between the anode and the cathode created by a difference between the hydrogen partial pressures at the anode and cathode. The hydrogen flux through the membrane is directly proportional to the voltage differential which can be computed using the Nernst equation. The Nerst equation relates the hydrogen partial pressure differential to the voltage differential as follows:

$$V = \frac{RT}{2F} \ln \frac{P_{H_2,C}}{P_{H_2,A}}$$

where V is the voltage differential; R, the gas constant = 8.314 Joules/°C.-mole; T is the temperature in degrees Celsius; F = 96,500 coulombs/equivalent; $P_{H_2,C}$ is the hydrogen partial pressure at the cathode; and $P_{H_2,A}$ is the hydrogen partial pressure at the anode.

Previously, a similar apparatus had been contemplated for use in purifying hydrogen. However, in the previous embodiment the driving force for the separation would have been an externally induced voltage differential between the anode and the cathode rather than a voltage differential induced by a difference in partial pressures. The major drawback of the earlier embodiment is providing the additional hardware necessary to externally induce a voltage differential. The present invention does not rely on any external source of energy to perform the hydrogen separation.

In the preferred embodiment of this invention, shown in FIG. 1, the main structural element of the composite membrane is a conductive membrane (10) which has two sides. In addition to supporting the other elements of the composite membrane, the conductive membrane performs several other functions which are described below. The anode (12) is disposed on one side of the conductive membrane, while the cathode (14) is disposed on the opposite side of the conductive membrane. The conductive membrane is fabricated from a material which is an electron conductor, therefore, it also serves as the electron conductor means for the composite membrane. The conductive membrane may be a matrix formed from carbon black powder which is capable of immobilizing a liquid electrolyte serving as the proton conductor means. Preferably, the conductive membrane will be a polymer sheet capable of conducting protons into which carbon particles or a carbon matrix has been incorporated. The preferred thickness for the conductive membrane is between approximately 2 mils to approximately 20 mils. The most preferred thickness for the conductive membrane is between approximately 5 mils to approximately 10 mils.

A conductive membrane formed from a carbon black powder will be similar to a fuel cell electrode. Such a membrane will comprise uncatalyzed carbon black particles impregnated with a polymer. The polymer provides structural integrity and permits the conductive membrane to function as a matrix for immobilizing a liquid electrolyte which serves as the proton conductor means. The conductive membrane will contain less polymer than a fuel cell electrode in order to enhance the membrane's ability to absorb the proton conducting electrolyte. The electrolyte may be phosphoric acid or an unpolymerized fluorinated sulfonic acid.

The preferred conductive membranes may be fabricated from a polymer sheet capable of conducting protons into which carbon particles or a carbon matrix capable of conducting electrons has been incorporated. For example, the conductive membrane may be fabricated from a polymer which contains a sulfonic acid group supported in a carbon black matrix. One such group of conductive polymers is fluorinated sulfonic acid polymer, such as a polymer with a polyperfluoroethylene backbone with sidechains of perfluoroisopropoxyethoxysulfonic acid, which may be purchased from DuPont, (Wilmington, DE) under the trademark of Nafion TM 117. This material can be dissolved in an alcohol and used to impregnate a carbon black matrix.

The two electrodes, the anode and the cathode, are disposed on opposite sides of the conductive membrane and are in contact with the conductive membrane. The electrodes comprise carbon supported catalysts, which may be noble metals, noble metal alloys, nickel, or heat treated macrocyclics, such as cobalt tetramethoxyphenylporphyrin, iron tetramethoxyphenylporphyrin, or cobalt tetraazaannulene. Preferably, the catalysts will be either noble metals or noble metal alloys which have been used as catalysts in fuel cells. Among the preferred catalysts are platinum, palladium, platinum-iridium, and platinum-gallium. These catalysts may be fabricated according to the methods taught by commonly owned U.S. Pat. Nos. 3,857,737 to Kemp et al., and 4,316,944 to Landsman et al., the disclosures of which are hereby incorporated by reference. In services in which the membrane will be exposed to high concentrations of carbon monoxide, the preferred catalysts include platinum-ruthenium, platinum-rhodium, or platinum-palladium, all of which display tolerance to carbon monoxide. These catalysts may be fabricated according to methods similar to the Kemp and Landsman patents. Preferably, the catalyst loadings on each electrode should be between approximately 0.01 mg/cm² to approximately 4 mg/cm². The most preferred loadings on each electrode are between approximately 0.05 mg/cm² to approximately 1.0 mg/cm².

If the conductive membrane is a carbon black membrane impregnated with a liquid electrolyte, the carbon supported catalyst may be deposited on its surface according to any method commonly used to prepare fuel cell electrodes. Such methods include spraying, filter transfer, or vacuum deposition from a cloud chamber. If the conductive membrane is a polymer capable of conducting protons, the carbon supported catalyst may be deposited on its surface by a filter transfer process. The anode catalyst may be deposited onto one side of the conductive membrane and the cathode catalyst may be deposited onto the opposite side of the conductive membrane.

An alternate embodiment of this invention may comprise a doped, proton conducting oxide disposed between the anodes and cathodes. The proton conducting oxide would serve as the proton conductor and, after being doped to make it electrically conductive, as the electron conductor as well. Examples of proton conducting oxides which may be doped to make them electrically conductive include $SrCeO_3$ and $BaCeO_3$.

EXAMPLE 1

The concept of using a composite membrane to purify hydrogen was demonstrated using a standard sub-scale phosphoric acid fuel cell. A fuel cell is an alternate, though less preferred, apparatus which can be used to practice this invention. The fuel cell, which lacks an electronically conductive membrane, comprises an anode, a cathode, and an electrolyte-impregnated matrix disposed between the two electrodes. In the demonstration fuel cell, the cell had a 5.0 mil thick matrix comprising SiC. Thirty-five percent (35%) of the cell's pore volume was filled with phosphoric acid fuel cells. The additional phosphoric acid was added to the cell to reduce the possibility of gas diffusion through the cell. The anode comprised an unalloyed, carbon supported platinum catalyst with a loading of 0.48 milligram of platinum per square centimeter and 50 wt% polytetrafluoroethylene (for example, a Teflon TM polymer manufactured by DuPont). The cathode comprised a carbon-supported platinum-cobalt-chromium catalyst with a loading of 0.88 milligram of platinum per square centimeter and 35 wt% polytetrafluoroethylene (Teflon TM). The two electrodes were externally shorted with an AWG-1 (American Wire Gauge) welding cable capable of passing 100-250 amps. A voltage differential of less than one millivolt between the two electrodes was considered to be a good short. Two tests were performed in order to accurately determine the hydrogen selectivity relative to nitrogen. In the first test, a gas containing nitrogen saturated at 60° C. was supplied to the anode. In the second test, a gas containing hydrogen saturated at 60° C. was supplied to the anode. In both tests, dry carbon dioxide was supplied to the cathode side of the composite membrane in order to maintain the same total pressure on the cathode side as on the anode side. Carbon dioxide was used because it is easily distinguishable from nitrogen and hydrogen in gas analysis. In both tests, the fuel cell was allowed to operate at 204° C. for several hours before gas from the cathode was collected in a cylinder and analyzed using gas chromotography. A comparison of the two tests showed that the phosphoric acid fuel cell composite membrane had a hydrogen/nitrogen selectivity of 322 mole $H_2$/mole $N_2$ at a hydrogen flux of $386 \times 10^{-6}$ standard $cm^3$/sec $cm^2$ cmHg.

EXAMPLE 2

The second demonstration of this invention used a fuel cell which included a Nafion TM FN117 membrane functioning as the electrolyte. The Nafion TM membrane was obtained from DuPont (Wilmington, DE).

The Nafion TM membrane served only as the proton conductor. The anode and the cathode catalysts were unsupported platinum with a loading of 4.04 milligrams of platinum per square centimeter. As in Example 1, two tests were performed to estimate hydrogen selectivity relative to nitrogen. In the first test, the two electrodes were shorted with an AWG-1 welding cable. Hydrogen saturated at 82° C. was supplied to the anode side of the composite membrane. The hydrogen content of the gas leaving the cathode was continuously monitored with phosphoric acid electrochemical cell. Total pressure on both sides of the membrane was kept equal by supplying carbon dioxide saturated at 82° C. to the cathode side of the composite membrane as in Example 1. The fuel cell was operated at 82° C. The second test was performed in the same manner as the first test, except that the two electrodes were not shorted. The purpose of the second test was to determine the rate at which hydrogen would diffuse through the composite membrane solely by molecular diffusion. The results of the second test were compared with the results of the first test to estimate the hydrogen/nitrogen selectivity. The hydrogen/nitrogen selectivity of this composite membrane was estimated to be approximately 14000 mole $H_2$/mole $N_2$ at a hydrogen flux of $94.2 \times 10^{-6}$ standard $cm^3$/sec $cm^2$ cmHg.

Figure 2:
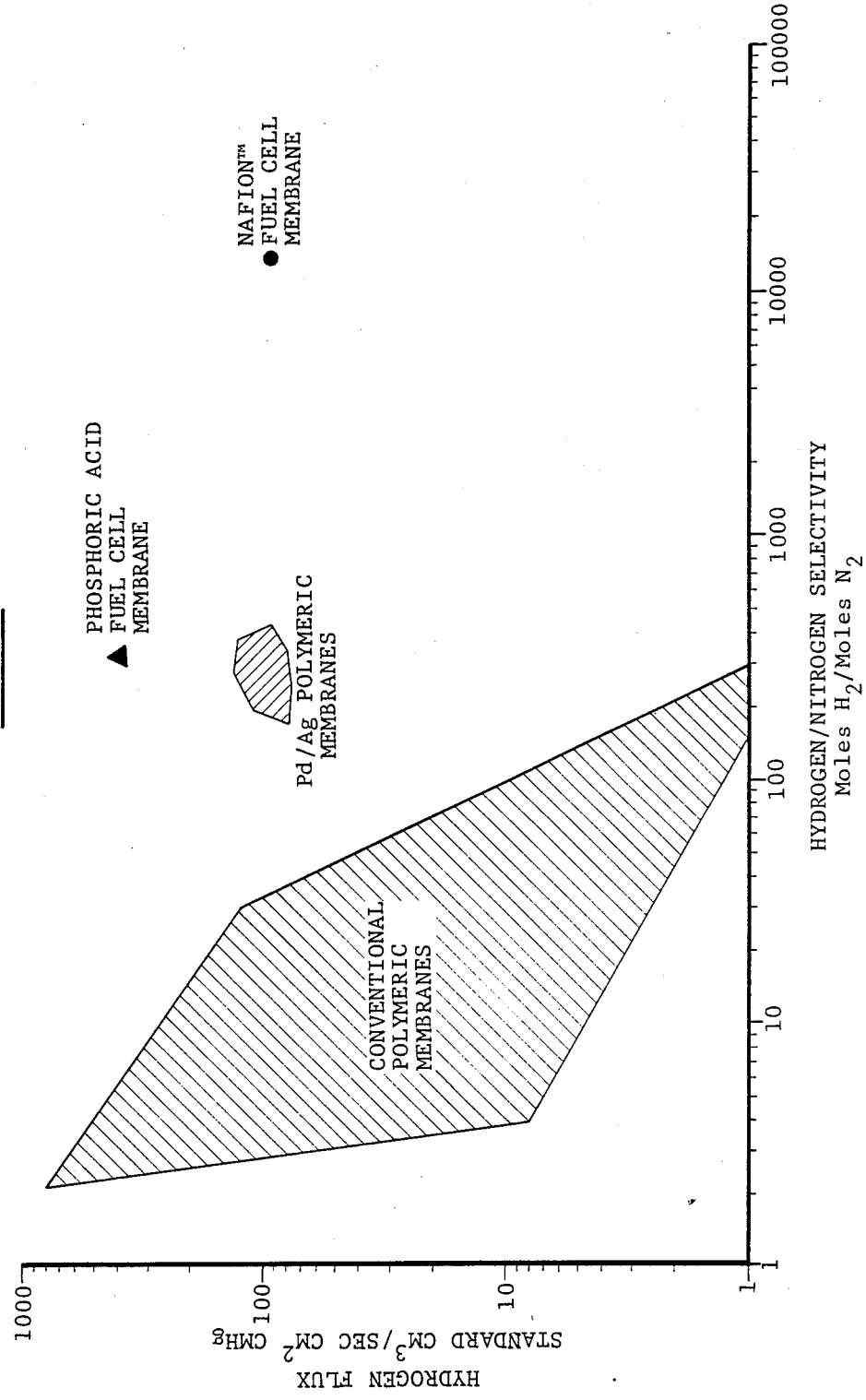
FIG. 2 is a graphical representation of experimentally determined hydrogen flux and hydrogen/nitrogen selectivity for two types of composite purification membranes, typical polymeric membranes, and membranes prepared by vacuum sputtering palladium-silver onto polyetherimide.

The results obtained from the experiments described in Example 1 and Example 2 are shown on FIG. 2, which shows hydrogen flux plotted versus hydrogen/nitrogen selectivity. Representative values for two competing technologies, polymeric membranes and vacuum-sputtered palladium-silver membranes, are also plotted on FIG. 2. A good hydrogen purification membrane will permit a high hydrogen flux and while maintaining a high hydrogen selectivity. As shown in FIG. 2, both the phosphoric acid fuel cell composite membrane and the Nafion TM fuel cell composite membrane out performed the conventional polymeric membranes. The Nafion TM fuel cell composite membrane also performed better than the vacuum-sputtered palladium-silver membranes. The phosphoric acid fuel cell composite membrane demonstrated a higher hydrogen flux at a comparable hydrogen/nitrogen selectivity than the vacuum-sputtered palladium-silver membranes.

Although this invention has been shown and described with respect to detailed embodiments thereof, it will be understood by those skilled in the art that various changes in form and detail thereof may be made without departing from the spirit and scope of the claimed invention.

I claim:

1. A composite hydrogen purification membrane for use in purifying a gas containing hydrogen and gaseous impurities, the membrane comprising:
   (a) an anode for oxidizing the hydrogen to form protons and electrons;
   (b) a cathode for reducing the protons and electrons to form hydrogen;
   (c) a proton conductor means disposed between and in contact with the anode and the cathode for conducting the protons to the cathode;
   (d) an electron conductor means connecting said anode to said cathode for conducting the electrons to the cathode, a partial pressure differential between the anode and the cathode providing the driving force for the oxidation and reduction, without having an external voltage source.

2. The membrane of claim 1 wherein the anode comprises a carbon supported catalyst selected from the group consisting of a noble metal, noble metal alloy, nickel, and a heat treated macrocyclic compound.

3. The membrane of claim 2 wherein the carbon supported noble metal catalyst comprises platinum or palladium.

4. The membrane of claim 2 wherein the carbon supported noble metal alloy catalyst comprises a platinum-iridium, platinum-ruthenium, platinum-rhodium, or platinum-palladium alloy.

5. The membrane of claim 2 wherein the carbon supported heat treated macrocyclic compound catalyst is cobalt tetramethoxyphenylporphyrin, iron tetramethoxyphenylporphyrin, or cobalt tetraazaannulene.

6. The membrane of claim 2 wherein the anode catalyst loading is between approximately 0.01 mg/cm$^2$ and approximately 4 mg/cm$^2$.

7. The membrane of claim 2 wherein the anode catalyst loading is between approximately 0.05 mg/cm$^2$ and approximately 1.0 mg/cm$^2$.

8. The membrane of claim 1 wherein the cathode comprises a carbon supported catalyst selected from the group consisting of a noble metal, noble metal alloy, nickel, and a heat treated macro cyclic compound.

9. The membrane of claim 8 wherein the carbon supported noble metal catalyst comprises platinum or palladium.

10. The membrane of claim 8 wherein the carbon supported noble metal alloy catalyst comprises platinum-iridium or platinum-gallium.

11. The membrane of claim 8 wherein the carbon supported heat treated macrocyclic compound catalyst is cobalt tetramethoxyphenylporphyrin, iron tetramethoxyphenylporphyrin, or cobalt tetraazaannulene.

12. The membrane of claim 8 wherein the cathode catalyst loading is between approximately 0.01 mg/cm$^2$ and approximately 4 mg/cm$^2$.

13. The membrane of claim 8 wherein the cathode catalyst loading is between approximately 0.05 mg/cm$^2$ and approximately 1.0 mg/cm$^2$.

14. The membrane of claim 1 wherein the proton conductor means is phosphoric acid.

15. The membrane of claim 1 wherein the proton conductor means is an unpolymerized fluorinated sulfonic acid or a fluorinated sulfonic acid polymer.

16. The membrane of claim 15 wherein the proton conductor means is a polymer with a polyperfluoroethylene backbone with sidechains of perfluoroisopropoxyethoxysulfonic acid.

17. The membrane of claim 1 wherein the electron conductor means is a carbon black powder or graphitized carbon.

18. The membrane of claim 1 wherein the electron conductor means is a wire or cable.

19. The membrane of claim 1 wherein the proton conductor means comprises a proton conducting oxide which has been doped to be made electrically conductive.

20. The membrane of claim 19 wherein the proton conducting oxide is $SrCeO_3$ or $BaCeO_3$.

21. The membrane of claim 1 wherein the composite membrane is between approximately 2 mils and approximately 20 mils thick.

22. The membrane of claim 1 wherein the composite membrane is between approximately 5 mils and 10 mils thick.

23. A method of purifying a gas containing hydrogen and gaseous impurities comprising:
  (a) contacting the gas with a composition hydrogen purification membrane which comprises an anode for hydrogen oxidation, a cathode for hydrogen ion reduction, a proton conductor means disposed between and in contact with the anode and cathode, and an electron conductor means connecting said anode and cathode, said contacting resulting in the hydrogen contained in the gas being oxidized by the anode to form protons and electrons, the protons being conducted to the cathode through the proton conductor means and the electrons being conducted to the cathode through the electron conductor means where said protons and electrons recombine in a reduction reaction to form hydrogen molecules; and
  (b) removing hydrogen from said cathode of the composite hydrogen purification membrane in order to maintain a hydrogen partial pressure differential between said cathode and anode, in an amount sufficient to provide the driving force for the oxidation and reduction without using an external voltage source.

24. The method of purifying of claim 23 wherein the gas is contacted with an anode comprising a carbon supported catalyst selected from the group consisting of a noble metal, noble metal alloy, nickel, and a heat treated macro cyclic compound.

25. The method of purifying of claim 24 wherein the noble metal is platinum or palladium.

26. The method of purifying of claim 24 wherein the noble metal alloy is a platinum-iridium, platinum-ruthenium, platinum-rhodium, or platinum-palladium alloy.

27. The method of purifying of claim 24 wherein the heat treated macrocyclic compound is cobalt tetramethoxyphenylporphyrin, iron tetramethoxyphenylporphyrin, or cobalt tetraazaannulene.

28. The method of purifying of claim 24 wherein the anode catalyst is loaded to between approximately 0.01 mg/cm$^2$ and approximately 4 mg/cm$^2$.

29. The method of purifying of claim 24 wherein the anode catalyst is loaded to between approximately 0.05 mg/cm$^2$ and approximately 1.0 mg/cm$^2$.

30. The method of purifying of claim 23 wherein the gas is contacted with a cathode comprising a carbon supported catalyst selected from the group consisting of a noble metal, noble metal alloy, nickel, and a heat treated macrocyclic compound.

31. The method of purifying of claim 30 wherein the noble metal is platinum or palladium.

32. The method of purifying of claim 30 wherein the noble metal alloy is platinum-iridium or platinum-gallium.

33. The method of purifying of claim 30 wherein the heat treated macrocyclic compound is cobalt tetramethoxyphenylporphyrin, iron tetramethoxyphenylporphyrin, or cobalt tetraazaannulene.

34. The method of purifying of claim 30 wherein the cathode catalyst is loaded to between approximately 0.01 mg/cm$^2$ and approximately 4 mg/cm$^2$.

35. The method of purifying of claim 30 wherein the cathode catalyst is loaded to between approximately 0.05 mg/cm$^2$ and approximately 1.0 mg/cm$^2$.

36. The method of purifying of claim 23 wherein the proton conductor means is phosphoric acid.

37. The method of purifying of claim 23 wherein the proton conductor means is an unpolymerized fluorinated sulfonic acid or a fluorinated sulfonic acid polymer.

38. The method of purifying of claim 37 wherein the proton conductor means is a polymer with a polyperfluoroethylene backbone with sidechains of perfluoroisopropoxyethoxysulfonic acid.

39. The method of purifying of claim 23 wherein the electron conductor means is a carbon black powder or graphitized carbon.

40. The method of purifying of claim 23 wherein the electron conductor means is a wire or cable.

41. The method of purifying of claim 23 wherein the proton conductor means comprises a proton conducting oxide which has been doped to be made electrically conductive.

42. The method of purifying of claim 41 wherein the proton conducting oxide is $SrCeO_3$ or $BaCeO_3$.

43. The method of purifying of claim 23 wherein the composite membrane is between approximately 2 mils and approximately 20 mils thick.

44. The method of purifying of claim 23 wherein the composite membrane is between approximately 5 mils and 10 mils thick.

* * * * *

UNITED STATES PATENT AND TRADEMARK OFFICE
CERTIFICATE OF CORRECTION

PATENT NO. : 4,911,803

DATED : March 27, 1990

INVENTOR(S) : Harold R. Kunz

It is certified that error appears in the above-identified patent and that said Letters Patent is hereby corrected as shown below:

On the title page please insert the following:

--Item [73] Assignee: International Fuel Cells Corporation,
South Windsor, Conn.--

Signed and Sealed this

Third Day of March, 1992

Attest:

HARRY F. MANBECK, JR.

Attesting Officer

Commissioner of Patents and Trademarks